Nov. 6, 1962 J. R. THOMPSON 3,062,385
OUTRIGGER-EQUIPPED LOADER-YARDER VEHICLE
Filed April 25, 1960 7 Sheets-Sheet 1

INVENTOR
JAMES RUSSELL THOMPSON

ATTORNEYS

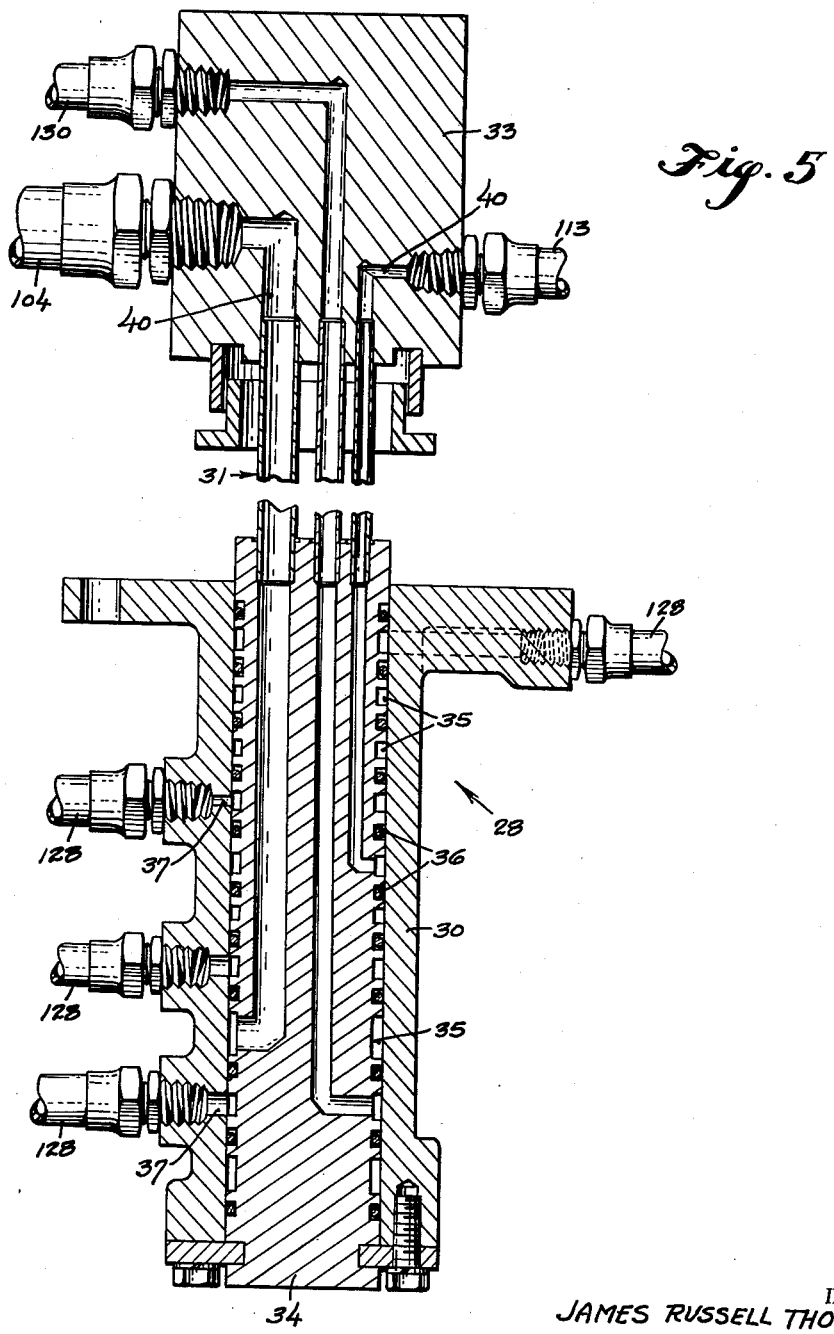

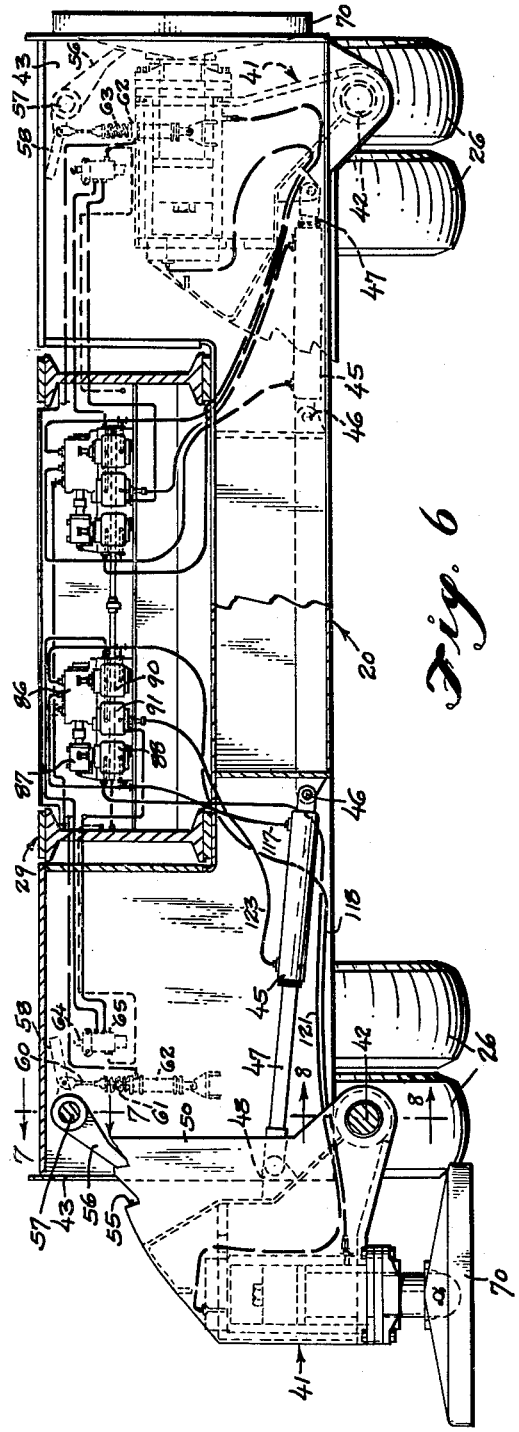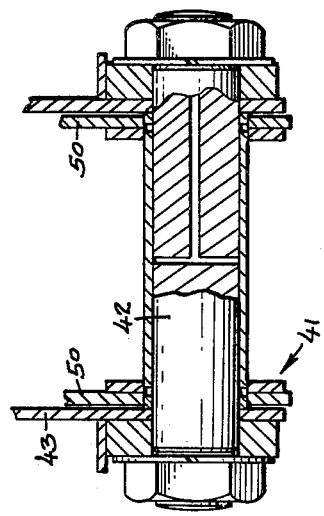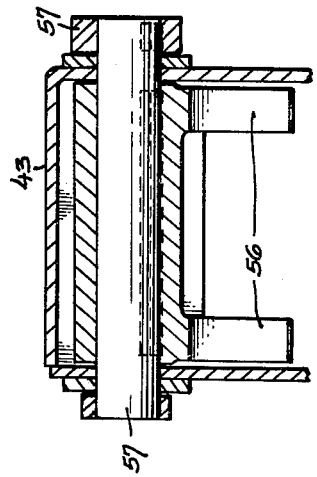

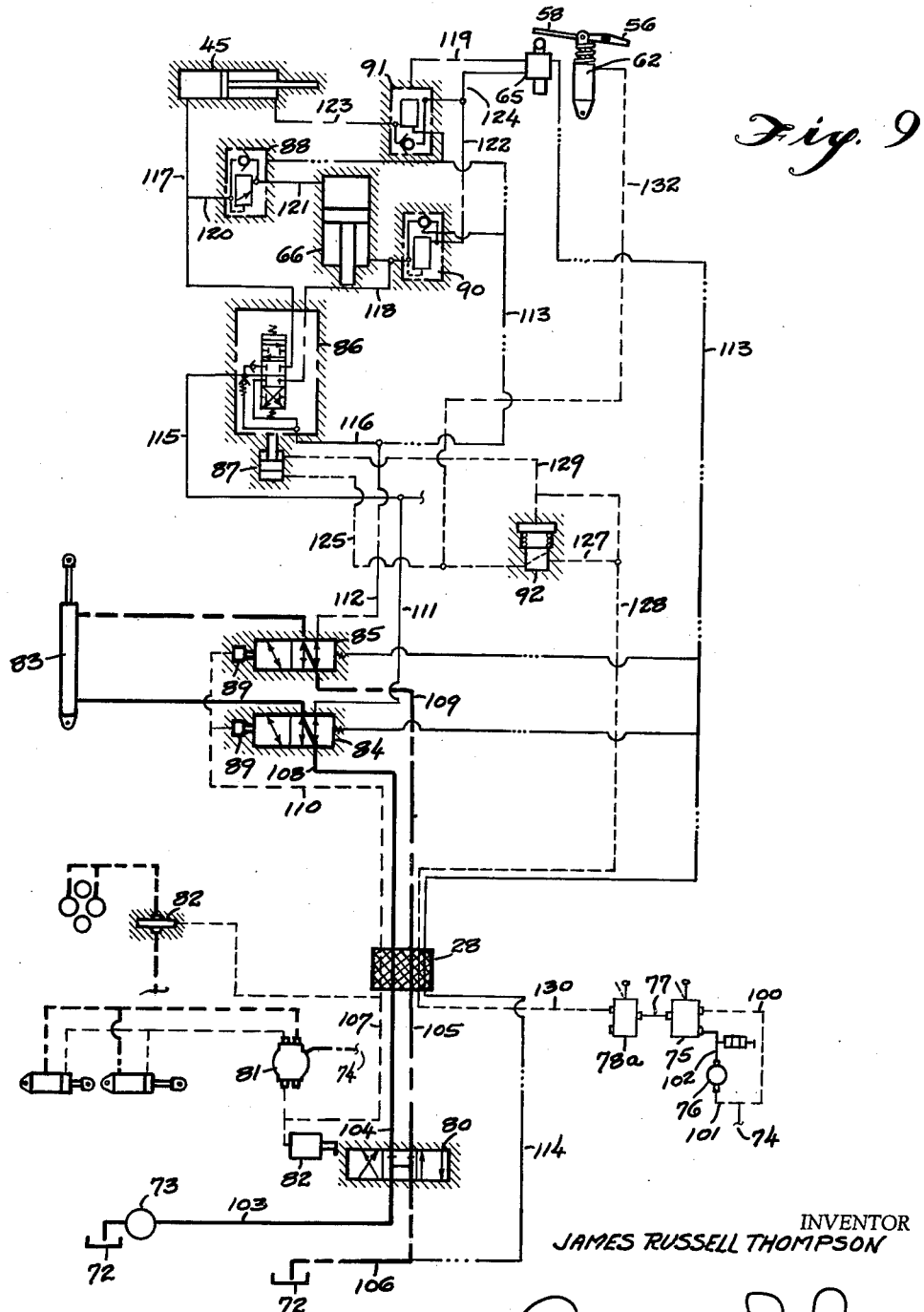

INVENTOR
JAMES RUSSELL THOMPSON

United States Patent Office 3,062,385
Patented Nov. 6, 1962

3,062,385
OUTRIGGER-EQUIPPED LOADER-YARDER VEHICLE
James Russell Thompson, Seattle, Wash., assignor to Washington Iron Works, Seattle, Wash., a corporation of Washington
Filed Apr. 25, 1960, Ser. No. 24,457
19 Claims. (Cl. 212—145)

This invention relates to improvements in outrigger-equipped mobile vehicles such, for example, as a loader-yarder wherein a wheeled lower unit gives support to a working upper unit, the upper unit having a turntable mounting permitting such upper unit to perform the loading and yarding function for which the vehicle is engineered. The purpose of the outriggers is to provide stable supports on which the vehicle rests when loading and yarding operations are being carried on. Such outriggers are mounted for movement between elevated inoperative positions and lowered operating positions.

For its principal object the invention aims to generally perfect a vehicle of the character described and provide, in particular, a vehicle having a plurality of outriggers each of which admit of being individually controlled from a control station located upon the working or turntable-mounted upper unit.

As a further important object the invention proposes to provide a vehicle of the described nature characterized in that its outriggers each comprise an arm mounted for swinging motion in a vertical plane, a lifting jack carried for relative vertical movement by the arm, and a perfected means of releasably locking both the arm and jack in operating extended and inoperative lowered positions, respectively.

The invention has the yet additional object of providing an unusually efficient fool-proof pressure-fluid system for operating the outrigger mechanisms.

It is a still further and particular object to provide a system by means of which a succession of desired operating steps are performed sequentially in moving the outriggers both into and out of operating positions automatically in response to movement, for each of the outriggers, of a single control handle related thereto.

Other still more particular objects and advantages will, with the foregoing, appear and be understood in the course of the following description and claims, the invention consisting in the novel construction and in the adaptation and combination of parts hereinafter described and claimed.

In the accompanying drawings:

FIG. 5 is a fragmentary vertical sectional view detailing the construction of the king pin employed with the present system.

FIG. 6 is a full-width transverse vertical sectional view of the vehicle, partly schematic, and showing an outrigger mechanism at one side of the vehicle extended as in use and an outrigger mechanism at the other side retracted into a housed inoperative position.

FIGS. 7 and 8 are fragmentary longitudinal vertical sectional views drawn to an enlarged scale on lines 7—7 and 8—8, respectively, of FIG. 6.

Figure 1:
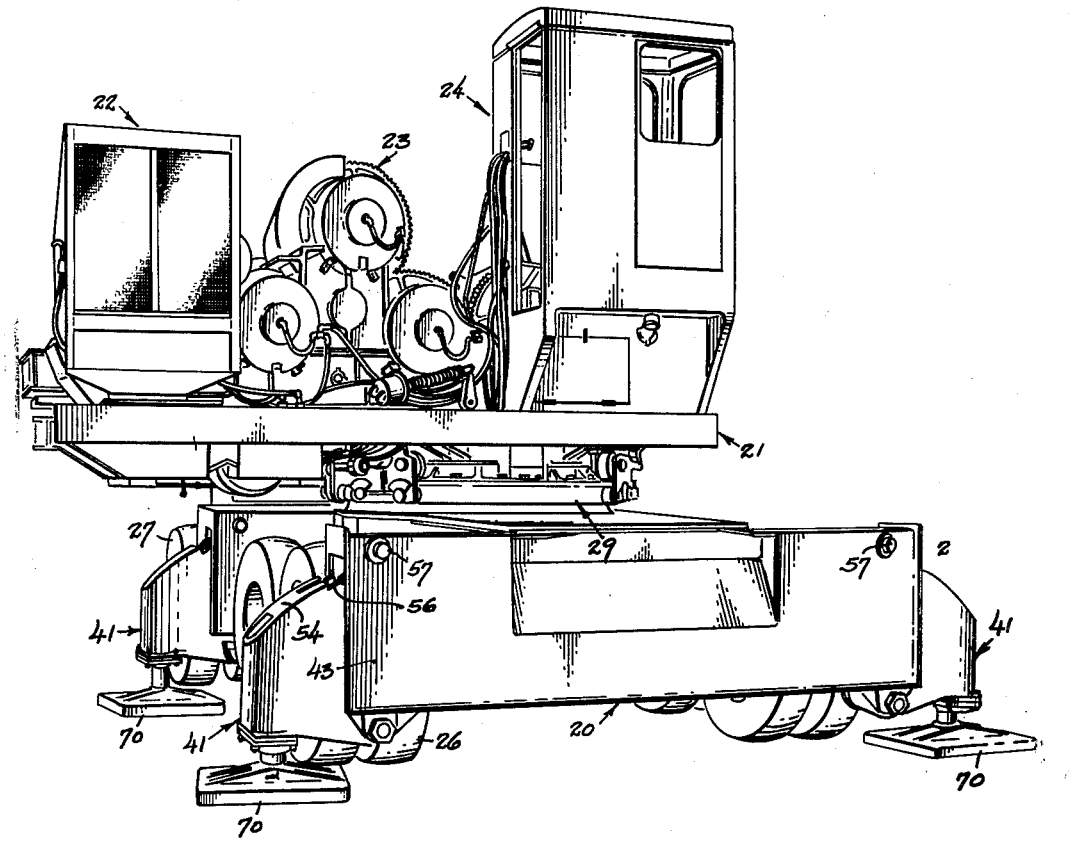
FIGURE 1 is a perspective view portraying a loader-yarder vehicle having outriggers constructed and arranged in accordance with the preferred teachings of the present invention. For simplicity in illustration the showing of the working upper unit is confined to the power plant, winding drums, operator's cab, and platform.
Figure 2:
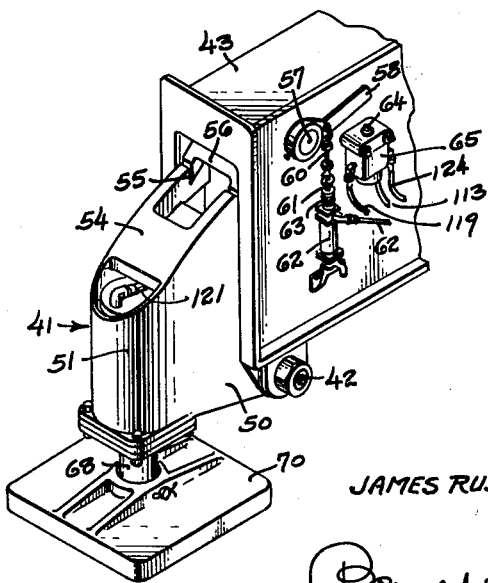
FIG. 2 is a fragmentary perspective view of one of the outriggers drawn to a larger scale.
Figure 3:
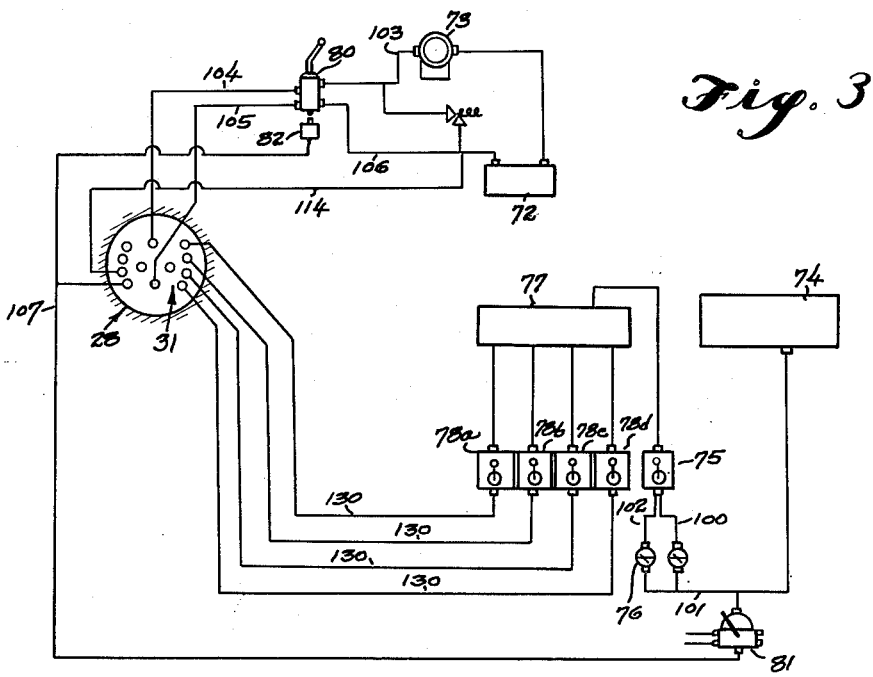
FIG. 3 is a schematic plan view of that portion of the control system which is carried by the vehicle's upper unit.
Figure 4:
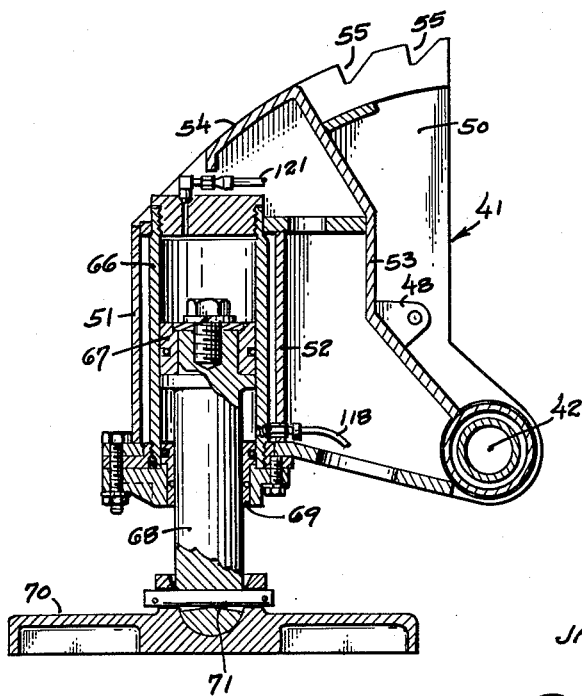
FIG. 4 is a transverse vertical sectional view through one of the outrigger mechanisms.
Figure 10:
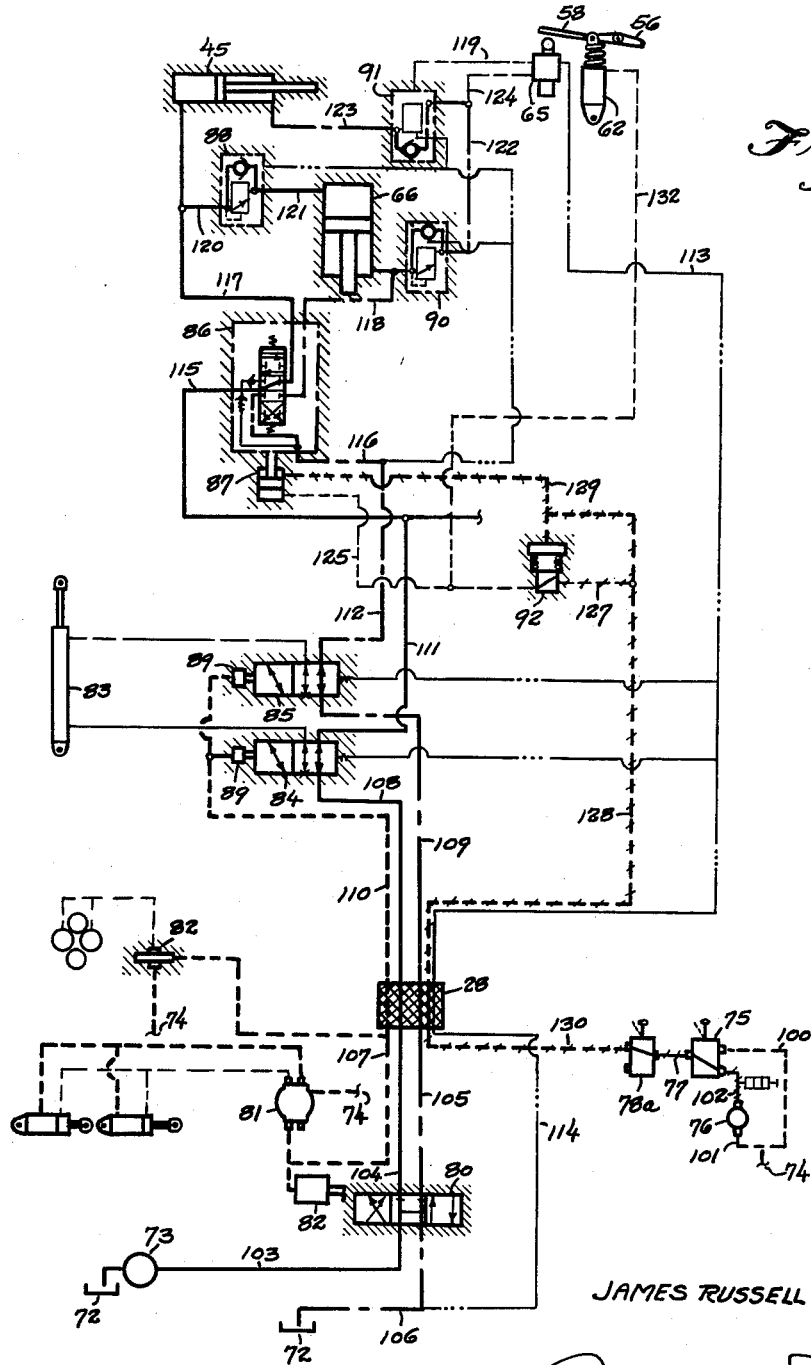
Figure 11:
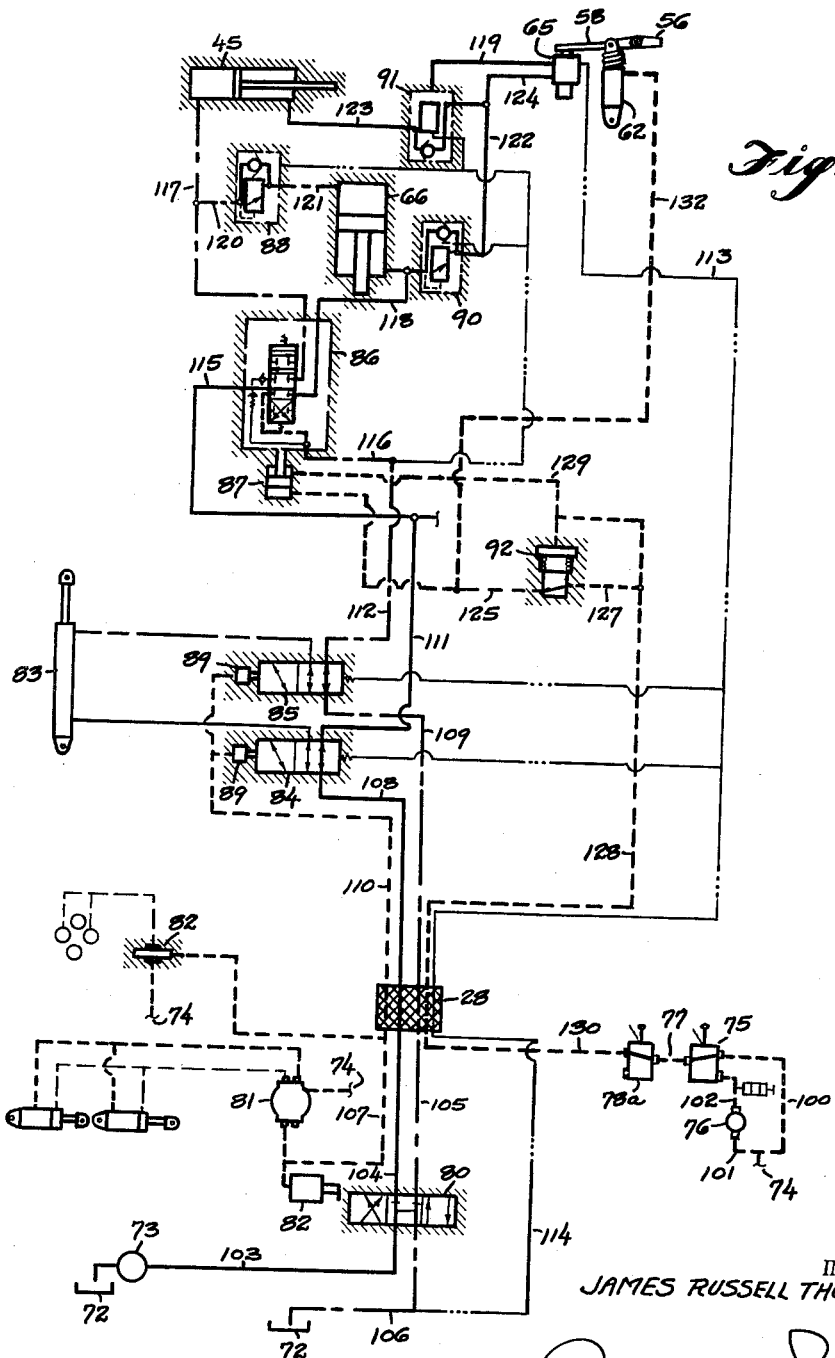

FIGS. 9, 10 and 11 are schematic circuitry views of the present control system, with dark and light lines distinguishing connections and parts which are operative and inoperative, respectively, when the vehicle is being steered (FIG. 9), when the outriggers are being lowered (FIG. 10), and when the outriggers are being raised (FIG. 11). Legends for these views are as follows:

Unbroken—hydraulic pressure line
Alternating long and short dash—hydraulic return line
Triple dot and long dash—hydraulic drain line
Dash—high pressure air
Crossed dash—low pressure air The under-carriage of the present mobile loader-yarder vehicle provides a main frame designated by the numeral 20. A frame for the turntable-mounted upper unit is denoted by 21. As can be seen from an inspection of FIG. 1 said upper unit carries a power plant 22, winding drum 23, and a cab 24 in which are the several controls for the operation of the vehicle. These controls govern two fluid circuits, one for compressed air and the other for oil, such circuits being employed to operate the vehicle's working equipment, including steering, and for activation of outrigger mechanisms. The present invention is concerned only with the outrigger mechanisms excepting as interlock means are provided to preclude the other operations from being performed while such outriggers are hydraulically activated into or out of operating positions.

Two such outriggers are provided for each of the two sides of the vehicle, one being located aft of tandem rear ground wheels 26 and the other lying between said tandem wheels and a steerable front ground wheel 27. The vehicle's turntable 29 lies in a transverse vertical plane located more or less intermediate said front and rear outriggers, and has a vertical opening provided in its center. This opening is occupied by a king pin 28, the function of which is to pass compressed air or hydraulic fluid, as the case may be, from the upper level of the frame 21 to the lower level of the frame 20. Detailed in FIG. 5 such king pin comprises an elongated housing 30 fixedly attached to the frame 20, and a bundled assembly 31 of tubes fixedly attached to the frame 21. Ten tubes are provided in the bundles but the present invention is concerned with only eight of these tubes. The tubes extend vertically from a head 33 to a core 34 which is journaled for rotation within a vertical bore provided by the housing. Multiple fluid-flow grooves 35, one for each tube, extend circumferentially about the core at spaced intervals of the circumference, and above and below each of these fluid-flow grooves there is provided a sealing groove occupied by a respective O-ring seal 36. A respective port is provided in the wall of the bore to register with each of the fluid-flow grooves. Connecting by a respective passageway 37 with each of such ports is a respective one of a plurality of lower-level pipes (four of which are shown) leading to or from a related one or more of a plurality of devices, hereinafter to be described, which function either directly or indirectly to govern the operation of a steering cylinder 83 and the referred-to four outrigger mechanisms. The head 33 is suitably drilled to provide passage-ways 40 connecting each of the tubes with a respective upper-level pipe.

Proceeding now to describe the four outrigger mechanisms, each comprises an outrigger arm 41 pivoted, as at 42, to a lateral extension 43 of the main frame 20. This lateral extension has an inverted-U shape in cross-section, producing an open-end pocket which functions as a housing for the arm. The permitted swing motion of the arm about said pivot 42 as an axis is approximately 90°, moving between a lowered operating position in which the arm is exposed and an elevated inoperative position in which the arm is housed. A hydraulic double-acting piston-and-cylinder assembly is employed to activate the arm in its said swing motion, the cylinder 45 being pivotally mounted to the frame 20, as at 46. A piston rod 47 connects with the arm by a wrist pin traversing a pair of spaced-apart lugs 48. The said arm is fabricated from a sheet of plate stock bent upon itself to provide separated cheeks 50 joined by a loop 51 and stiffened by webs 52—53 extending as spanners between the cheeks. The cheeks present corresponding shoulder portions 54 having an arcuate profile configuration when viewed from the side, the curve being developed concentric to the pivotal axis of the arm, and in each of these shoulders there is provided one or more abutment-type notches 55 serving as ratchet teeth for respective pawls 56 (see FIG. 6). The pawls engage the teeth by force of gravity.

A rock-shaft 57 to which said pawls are fixed traverses the frame extension 43 and has an end exposed beyond the latter. A lever arm 58 is fixed to this exposed end. Having as one of two functions a retraction of the twin pawls 56, said lever arm connects by a link 60 with the rod 61 of a single-acting piston working in an air cylinder 62. While not shown, the link has a pin-and-slot connection with the lever arm so as not to interfere with the gravity action of the latter. A spring 63 is provided to return the air piston to its normal elevated position upon dumping pressure air from the cylinder. The other of the two functions of the lever arm 58 is to depress a valve stem 64 and by such depression open a normally closed pilot valve 65. The office of this pilot valve will hereinafter appear in course of tracing the fluid pressure systems, oil and air which operate the outrigger arms and a respective hydraulic jack associated with each arm.

Cylinders 66 for said jacks are mounted between said cheeks of the outrigger arms in positions tangent to a circle taken about the pivot pin 42 as a center. A double-acting piston 67 is received in the cylinder. A piston rod 68 extends through a gland 69 and upon its exposed lower end carries a ground-engaging pad 70, such pad having a loose-footed connection 71 with the rod.

The control systems for the four outrigger mechanisms are independent other than as they employ a common reservoir 72 from which oil is drawn by a pump 73, and a common source 74 from which air under pressure is supplied through a hand-operated master valve 75. The supplied air may be either under high or low pressure, according as it is supplied directly by a pipe 100 to one of two selective inlet ports of the valve 75 or by pipes 101 and 102 through a pressure regulator 76 to the second inlet port. This regulator is set at 50 p.s.i. A manifold 77 fed from the outlet port of said master valve leads to four hand-operated selector valves 78a, 78b, 78c, and 78d, one for each outrigger mechanism. For the hydraulic side of the controls, a single hand-operated 2-position steering valve 80 operates to connect two ports at one side with two ports at the other side, either directly as shown or through a cross-over, selectively, so that pipe 103 leading from the pump 73 is brought into communication either with a pipe 104 or a pipe 105, while a pipe 106 leading to the reservoir 72 is brought into coincident communication with pipes 105 and 104, in the respective instance. An associated valve 81, likewise hand-operated, receives air under pressure from the source 74. This latter valve is of moment to the present invention only as it acts, when in "jack" position, to close a normally open interlock valve 82 which holds the steering valve 80 in its said direct-flow position and also supplies air under pressure from the supply source 74 to a pipe 107.

The above-described parts 72 and 82, inclusive, and the pipes 100 through 107, inclusive, are mounted on the upper unit of the vehicle. Parts and pipes hereinafter described are mounted on the under-carriage. These lower-level parts include the hydraulic cylinder 83 providing power steering of the vehicle when the latter is under way, the oil being supplied to either end selectively by two complementing selector valves 84 and 85 which are normally open to steering. Pipes 108 and 109 constituting lower-level continuations of the pipes 104 and 105 connect with one side of the selector valves 84 and 85, respectively. A pipe 110 constituting a lower-level continuation of the pipe 107 leads to a pair of air cylinders 89 whose function is to act upon the selector valves for isolating the steering cylinder and bring pipes 108 and 109 into communication with lower-level pipes 111 and 112, respectively.

These pipes 111 and 112 have as their function to supply oil to and return oil from the described cylinders 45 and 66 responsible for swinging the outrigger arms and operating the jacks. Such pipes function as substantial manifolds and, together with a drain pipe 113 which is a lower-level continuation of an upper-level drain pipe 114, are common to all of the outrigger mechanisms. It is to be understood that lower-level parts now to be described are duplicated for each of the four outrigger mechanisms. A description of the system as it pertains to one said mechanism will thus suffice for the others.

In addition to said oil cylinders 45 and 66, the single acting air cylinder 62, and its associated pilot valve 65, each lower-level control system includes a 3-position directional valve 86 normally occupying a neutral position and urged by activation of a differential air cylinder 87 into its other two positions. Respective pipes 115 and 116 connect one side of the directional valve with the two manifold pipes. Pipes 117 and 118 connect the other side one with the outer end of the swing cylinder 45 and the other with the lower end of the jack cylinder 66. A sequence valve 88 is provided between such pipe 117 and the upper end of cylinder 66, connecting therewith by pipes 120 and 121, this valve having a free reverse flow and being arranged to permit flow in the opposite direction only when the pressure within the line 117 rises to a predetermined value, say 750 p.s.i. Reverse flow in this instance is considered directively from the cylinder 66. A second sequence valve 90 opening under force of a similar pressure and likewise having a free reverse flow connects by one side with the pipe 118 and has its other side connected by a pipe 122 with one side of a reaction valve 91. Reverse flow in this instance is directively from cylinder 45. A pipe 123 connects the other side of valve 91 with the inner end of the swing cylinder 45. Valve 91 permits free reverse flow directively from cylinder 45 and is opened upon development of a given pressure condition within a pilot line 119. This line or pipe 119 leads to one side of the pilot valve 65. The other side of such pilot valve connects by a pipe 124 with the pipe 122.

The differential air cylinder 87 has its high-pressure side connected by a pipe 125 with one side of a relay valve 92 which opens at 80 p.s.i. A pipe 132 leads from pipe 125 to the pawl-retracting air cylinder 62. The relay valve has its other side connected by a pipe 127 with a lower-level continuation 128 of an upper-level air pipe 130 leading from the air valve 78a, 78b, 78c, and 78d, as the case may be. Such pipe 128 also connects by a pipe 129 with the low-pressure side of the differential air valve, this latter pipe also supplying the pressure head to the relay valve 92.

Tracing the operation, let it be assumed that the vehicle is being moved from one to another operating site. As indicated in FIG. 9, master valve 75 is in "off" position, as are each of the air valves 78a, 78b, 78c and 78d, thus isolating each of the air lines 130 from the supply source 74. Air valve 81 is placed in "travel" position which isolates line 107 from the pilot cylinders 89 of the selector valves 84 and 85, thus bringing said selector valves into communication with the two ends of the steering cylinder. "Travel" position also isolates the interlock valve 82 so that the operator is enabled to freely shift the 3-position steering control valve 80. In one position of this valve the pressure oil line 103 connects with line 104, and return line 105 connects with line 106. In the other position the lines are reversed.

Having reached an operating site and desiring to lift the vehicle off its ground wheels onto the ground-engaging loose-footed pads 70, the operator (see FIG. 10) places valve 81 in its "jack" position. This imposes air pressure on the interlock valve 82 so as to lock the steering control valve 80 in the position shown, and coincidentally delivers pressure air through pipes 107 and 110 to pilot cylinders 89, causing the selector valves 84 and 85 to shift into a position whereat the steering cylinder is isolated and lines 108 and 109 are brought into communication with lines 111 and 112, respectively. At the same time master air valve 75 and jack valves 78a, 78b, 78c and 78d are placed in "lowering" position and "on" position, respectively. Low pressure air responsively flows by pipes 102, manifiold 77, and pipes 130, 128 and 129 to the low pressure side of the differential valve 87, whereupon directional valve 86 brings pressure pipe 115 into communication with pipe 117, and return pipe 116 into communication with pipe 118. A sequential action responsively takes place, the cylinder 45 first acting to swing the outrigger arm outwardly and, as back pressure develops, the sequence valves 88 then opening to as to pass pressure oil to the head end of the jack cylinder 66. Pawl 56 drops by gravity into a ratchet notch of the outrigger arm. The jacks are now locked by placing the jack valves 78a, 78b, 78c and 78d in "off" position, whereupon low pressure air is dumped from the connecting lines 129, 128 and 130 causing the directional valve 86 to shift into its "neutral" position. This produces, for any given outrigger, a hydraulic lock in that lines 117 and 118 are isolated from the manifolds 115 and 116.

Should it now be desired to retract the outriggers (see FIG. 11), the valve 81 remains in the "jack" position, master air valve 75 is placed in "raising" position and the several jack valves 78a, 78b, 78c and 78d are opened. High pressure air now passes by pipe 100, manifold 77, and pipes 130, 128, 129, 127 and 125 to both sides of the differential pilot valve 87, the high pressure in this instance opening the relay valve 92. The superior pressure on the lower side of such differential valve shifts the directional valve 86 so that oil pressure manifold 115 connects with pipe 118, and oil return manifold 116 connects with pipe 117. Air pressure passed by pipe 126 to the pawl cylinder 62 lifts the pawl out of engagement with the outrigger arm. This action also depresses arm 58 so as to open the pilot valve 65. There is again a sequential action with pressure oil acting first to lift the jack as the oil passes by pipe 118 to the lower end of cylinder 66. Then as pressure rises upon the piston reaching the end of its stroke the oil passes through sequence valve 90 and line 122 to pilot-controlled valve 91. This valve, having been opened by pressure of oil in pipe 119, passes pressure oil by pipe 123 to the retracting cylinder 45. As with the lowered jacks, the outriggers can be locked in retracted position by simply dumping pressure air in consequence of placing the jack valves 78a, 78b, 78c and 78d in "off" positions.

It is believed that the invention will have been clearly understood from the foregoing detailed description of my now-preferred illustrated embodiment. Changes in the details of construction can be resorted to without departing from the spirit of the invention and it is accordingly my intention that no limitations are implied and that the hereto annexed claims are to be given the broadest interpretation to which the employed language fairly admits.

What I claim is:

1. In a mobile vehicle of the character described having a working upper unit mounted by a turntable upon a wheeled lower unit, a plurality of outrigger support mechanisms carried by said lower unit for movements between lowered operating positions and elevated inoperative positions, means on said lower unit activated by fluid pressure and connected with said outrigger mechanisms for operating the mechanisms in said movements, a source of fluid pressure carried by the upper unit, and connections including manual controls between said source and the fluid-pressure operated means for activating the latter, the manual controls being located on the upper unit, means subject to manual control being provided for releasably locking said outrigger support mechanisms at any selected point within the range of said mechanisms' movements.

2. In a mobile vehicle of the character described having a working upper unit mounted by a turntable upon a wheeled lower unit: a plurality of outrigger support mechanisms, said mechanisms each comprising an outrigger arm carried by the lower unit for movement from a retracted inoperative position into and out of an extended operating position, a locking pawl carried by the lower unit for movement into and out of engagement with a notch provided in the outrigger arm and placed to register with said pawl when the arm occupies said extended position, and an outrigger jack carried by the outrigger arm for movement from a retracted inoperative position into an extended operating position, a respective piston-and-cylinder ram assembly for each pawl, each outrigger arm, and each outrigger jack of the several outrigger mechanisms operated by fluid under pressure and connected with the related said part for operating the latter, a source of said fluid pressure for each ram assembly, and means controlled from a station on said upper unit for governing the delivery of such pressure fluid to the ram assemblies.

3. Structure according to claim 2 in which the ram for the pawl is operated by pressure air and wherein the rams for the arm and jack are each hydraulic.

4. In a mobile vehicle of the character described having a working upper unit mounted by a turntable upon a wheeled lower unit: a plurality of outrigger support mechanisms, said mechanisms each comprising an outrigger arm carried by the lower unit for movement from a retracted inoperative position into and out of an extended operating position, a locking pawl carried by the lower unit movable by gravity into engagement with a notch provided in the outrigger arm and placed to register with said pawl when the arm occupies said extended position, power-operated means for lifting the pawl out of said engagement, and an outrigger jack carried by the outrigger arm for movement from a retracted inoperative position into an extended operating position, a respective piston-and-cylinder ram assembly for each arm and each jack of each of the several outrigger mechanisms operated by fluid under pressure and connected with the related said part for operating the latter, a source of fluid under pressure, and means controlled from a station on said upper unit for governing the pawl-lifting power means and the delivery of said pressure fluid to the ram assemblies.

5. In a mobile vehicle of the character described having a working upper unit mounted by a turntable upon a wheeled lower unit: a plurality of outrigger support mechanisms, said mechanisms each comprising an outrigger arm carried by the lower unit for movement from a retracted inoperative position into and out of an extended operating position and an outrigger jack carried by the outrigger arm for movement from a retracted inoperative position into an extended operating position; a respective double-acting hydraulic ram for each arm and each jack of each of the several outrigger mechanisms connected therewith for activating the same in their said movements; an oil reservoir; means manually controlled from a position upon the upper unit for performing the following operations upon a selected one of the inoperatively positioned outrigger mechanisms: drawing oil from the reservoir and delivering the same under pressure first to the inner end of the arm ram and then to the inner end of the jack ram, while simultaneously returning oil to the reservoir from the outer ends of said hydraulic rams; and means also manually controlled from a position upon the upper unit for performing the following operations upon a selected one of the operatively positioned outrigger mechanisms: drawing oil from the reservoir and delivering the same under pressure first to the outer end of the jack ram and then to the outer end of the arm ram while simultaneously returning oil to the reservoir from the inner ends of said hydraulic rams, both of said manually controlled means including means powered by pressure air delivered from a source of compressed air.

6. In a mobile vehicle of the character described having a working upper unit mounted by a turntable upon a wheeled lower unit: a plurality of outrigger support mechanisms, said mechanisms each comprising an outrigger arm carried by the lower unit for movement from a retracted inoperative position into and out of an extended operating position, a locking pawl carried by the lower unit movable into and out of engagement with a notch provided in the outrigger arm and placed to register with said pawl when the arm occupies said extended position, and an outrigger jack carried by the outrigger arm for movement from a retracted inoperative position into an extended operating position; a respective double-acting hydraulic ram for each arm and each jack of each of the several outrigger mechanisms connected therewith for activating the same in their said movements; an oil reservoir; means manually controlled from a position upon the upper unit for performing the following operations upon a selected one of the inoperatively positioned outrigger mechanism: drawing oil from the reservoir and delivering the same under pressure first to the inner end of the arm ram and then to the inner end of the jack ram, while simultaneously returning oil to the reservoir from the outer ends of said hydraulic rams; and means also manually controlled from a position upon the upper unit for performing the following operations upon a selected one of the operatively positioned outrigger mechanisms: drawing oil from the reservoir and delivering the same under pressure first to the outer end of the jack ram and then to the outer end of the arm ram while simultaneously returning oil to the reservoir from the inner ends of said hydraulic rams.

7. In a mobile vehicle of the character described having a working upper unit mounted by a turnable upon a wheeled lower unit: a plurality of outrigger support mechanisms, said mechanisms each comprising an outrigger arm carried by the lower unit for movement from a retracted inoperative position into and out of an extended operating position, a locking pawl carried by the lower unit movable by gravity into engagement with a notch provided in the outrigger arm and placed to register with said pawl when the arm occupies said extending position, and an outrigger jack carried by the outrigger arm for movement from a retracted inoperative position into an extended operating position; a respective double-acting hydraulic ram for each arm and each jack of each of the several outrigger mechanisms connected therewith for activating the same in their said movements; a respective single-acting air-powered ram for lifting each pawl out of said engagement with the notch; an oil reservoir; a source of pressure air; means manually controlled from a position upon the upper unit for performing the following operations upon a selected one of the inoperatively positioned outrigger mechanisms: drawing oil from the reservoir and delivering the same under pressure first to the inner end of the arm ram and then to the inner end of the jack ram, while simultaneously returning oil to the reservoir from the outer ends of said hydraulic rams; and means also manually controlled from a position upon the upper unit for performing the following operations upon a selected one of the operatively positioned outrigger mechanisms: delivering pressure air from said air source to the air-powered ram as an act intervening between drawing oil from the reservoir and delivering the same under pressure first to the outer end of the jack ram and then to the outer end of the arm ram and while simultaneously returning oil to the reservoir from the inner ends of said hydraulic rams.

8. In a mobile vehicle of the character described having a working upper unit mounted by a turntable upon a wheeled lower unit, an outrigger arm carried by the lower unit for movement from a retracted inoperative position into and out of an extended operating position, a locking pawl carried by the lower unit movable by gravity into and out of engagement with a notch provided in the outrigger arm and placed to register with said pawl when the arm occupies said extended position, a ground-engaging foot carried by the outrigger arm for movement from a retracted inoperative position into an extended operating position, a respective double-acting hydraulic ram for the arm and for the foot connected therewith for activating the same in their said movements, a single-acting air-powered ram for lifting the pawl out of engagement with the notch, an oil reservoir, a pump drawing oil from said reservoir, a source of compressed air, a directional control valve provided with two front-side ports connected one to the pump and the other to the reservoir and by movement of the valve alternatively joined with two back-side ports connected one both to the outer end of the arm ram and through a free-reverse sequence valve with the outer end of the foot ram and the other both to the inner end of the foot ram and through a succession of two free-reverse sequence valves with the inner end of the arm ram, said sequence valve which feeds to the outer end of the foot ram opening at a predetermined pressure in the line, the first of said two sequence valves which feed to the inner end of the arm ram opening at a predetermined pressure in the line while the second of said two sequence valves opens at a predetermined pressure in a side branch, a connection including a normally closed pilot valve from the last mentioned line to the side branch opened automatically upon a disengagement of the pawl from the notch, a double-acting differential pilot air cylinder associated with the directional control valve acting upon delivery of pressure air to its inner end to shift the directional control valve so that the pump feeds to the outer ends of the hydraulic rams and upon delivery of pressure air to both ends to shift the directional control valve so that the pump feeds to the inner ends of the hydraulic rams, and an air line including a manually controlled valve for delivering pressure air from said source to either the inner or to both ends of the pilot air cylinder, selectively, means being provided acting upon delivery of said pressure air to both ends of the pilot air cylinder to simultaneously supply pressure air to the air-powered ram.

9. The structure recited in claim 8 in which said air supplied to the inner end of the pilot air cylinder is a low-pressure air and the air supplied to both ends of said cylinder is a high-pressure air, said outer end of such cylinder and the air-powered ram being normally isolated from the air line by a normally closed valve opened automatically by presence of high-pressure air in the air line.

10. The vehicle of claim 8, the wheels of said lower unit including steerable wheels, a double-acting hydraulic steering cylinder for operating said steerable wheels, manually controlled means for delivering oil from the pump to either end of said hydraulic cylinder, selectively, and means acting automatically by presence of pressure air in the air line to hold the last-named manually controlled means inactive.

11. Structure according to claim 10 in which the manual controls are located upon the upper unit.

12. Structure according to claim 8 in which the directional control valve, the sequence valves, the pilot valve, and the pilot air cylinder are located upon the lower unit.

13. In a mobile vehicle of the character described having a working upper unit mounted by a turntable upon a wheeled lower unit, an outrigger arm carried by the lower unit for movement from a retracted inoperative position into and out of an extended operating position, a locking pawl carried by the lower unit movable into and out of engagement with a notch provided in the outrigger arm and placed to register with said pawl when the arm occupies said extended position, a ground-engaging foot carried by the outrigger arm for movement from a retracted inoperative position into an extended operating position, a respective double-acting hydraulic ram for the arm and for the foot connected therewith for activating the same in their said movements, an air-powered ram for lifting the pawl out of engagement with the notch, an oil reservoir, a pump drawing oil from said reservoir, a source of compressed air, a directional control valve provided with two front-side ports connected one to the pump and the other to the reservoir and by movement of the valve alternatively joined with two back-side ports connected one both to the outer end of the arm ram and through a free-reverse sequence valve with the outer end of the foot ram and the other both to the inner end of the foot ram and through a succession of two free-reverse sequence valves with the inner end of the arm ram, said sequence valve which feeds to the outer end of the foot ram opening at a predetermined pressure in the line, the first of said two sequence valves which feed to the inner end of the arm ram opening at a predetermined pressure in the line while the second of said two sequence valves opens at a predetermined pressure in a side branch, a normally closed connection from the last-mentioned line to the side branch, means for opening said normally closed connection only upon a disengagement of the pawl from the notch, a double-acting pilot air cylinder associated with the directional control valve acting upon delivery of pressure air to its inner end to shift the directional control valve so that the pump feeds to the outer ends of the hydraulic rams and upon delivery of pressure air to its outer end to shift the directional control valve so that the pump feeds to the inner ends of the hydraulic rams, and an air line including a manually controlled valve for delivering pressure air from said source to either the inner or to the outer end of the pilot air cylinder, selectively, means being provided acting upon delivery of said pressure air to the outer end of the pilot air cylinder to simultaneously supply pressure air to the air-powered ram.

14. In a mobile vehicle of the character described having a working upper unit mounted by a turntable upon a wheeled lower unit, an outrigger arm carried by the lower unit for movement from a retracted inoperative position into and out of an extended operating position, a locking pawl carried by the lower unit movable into and out of engagement with a notch provided in the outrigger arm and placed to register with said pawl when the arm occupies said extended position, a ground-engaging foot carried by the outrigger arm for movement from a retracted inoperative position into an extended operating position, a respective double-acting hydraulic ram for the arm and for the foot connected therewith for activating the same in their said movements, power-operated means for lifting the pawl out of engagement with the notch, an oil reservoir, a pump drawing oil from said reservoir, a directional control valve provided with two front-side ports connected one to the pump and the other to the reservoir and by movement of the valve alternatively joined with two back-side ports connected one both to the outer end of the arm ram and through a free-reverse sequence valve with the outer end of the foot ram and the other both to the inner end of the foot ram and through a succession of two free-reverse sequence valves with the inner end of the arm ram, said sequence valve which feeds to the outer end of the foot ram opening at a predetermined pressure in the line, the first of said two sequence valves which feed to the inner end of the arm ram opening at a predetermined pressure in the line while the second of said two sequence valves opens at a predetermined pressure in a side branch, a connection including a normally closed pilot valve from the last-mentioned line to the side branch opened automatically upon a disengagement of the pawl from the notch, a double-acting pilot cylinder associated with the directional control valve acting upon delivery of pressure fluid to its inner end to shift the directional control valve so that the pump feeds to the outer ends of the hydraulic rams and upon delivery of pressure fluid to its outer end to shift the directional control valve so that the pump feeds to the inner ends of the hydraulic rams, and means including a manually controlled valve for delivering pressure fluid from a source therefor to either the inner or to the outer end of the pilot cylinder, selectively, means being provided acting upon delivery of said pressure fluid to the outer end of the pilot cylinder to simultaneously lift the pawl by activating the power-operated means therefor.

15. Structure according to claim 1, said lock being a hydraulic lock.

16. In a mobile vehicle of the character described having a wheeled lower unit: a plurality of outrigger support mechanisms, said mechanisms each comprising an outrigger arm carried by the lower unit for movement from a retracted inoperative position into and out of an extended operating position, a locking pawl carried by the lower unit for movement into and out of engagement with a notch provided in the outrigger arm and placed to register with said pawl when the arm occupies said extended position, and an outrigger jack carried by the outrigger arm for movement from a retracted inoperative position into an extended operating position, a respective piston-and-cylinder ram assembly for each pawl, each outrigger arm, and each outrigger jack of the several outrigger mechanisms operated by fluid under pressure and connected with the related said part for operating the latter, a source of said fluid pressure for each ram assembly, and manually controlled means for governing the delivery of such pressure fluid to the ram assemblies.

17. In a mobile vehicle of the character described having a working upper unit mounted by a turntable upon a wheel lower unit, the wheels of said lower unit including steering wheels, a plurality of outrigger support mechanisms carried by said lower unit for movements between lowered operating positions and elevated inoperative positions, power means on said lower unit activated by fluid pressure and connected with said outrigger mechanisms for operating the mechanisms in said movements, power means on said lower unit activated by fluid pressure and connected with said steering wheels for operating the steering wheels in their steering movements, and means for isolating either of said power means from a source of fluid pressure therefore automatically when fluid pressure is being delivered to the other power means.

18. In a mobile vehicle of the character described having a working upper unit mounted by a turntable upon a wheeled lower unit, the wheels of said lower unit including steering wheels, a plurality of outrigger support mechanisms carried by said lower unit for movements between lowered operating positions and elevated inoperative positions, power means on said lower unit activated by fluid pressure and connecting with said outrigger mechanisms for operating the mechanisms in said movements, pilot means activated by pressure fluid and operatively connected with the power means to cause fluid pressure to be supplied to the power means in response to pressure-fluid operated activation of the pilot means, power means on said lower unit activated by fluid pressure and connected with said steering wheels for operating the steering wheels in their steering movements, a connection opened and closed manually between said pilot means and a source of fluid pressure therefor, and means operating automatically by said act of opening and closing said connection to the pilot means for, in the respective instance, supplying fluid pressure to the first-named power means while isolating the second-named power means from a source of fluid pressure therefor and supplying fluid pressure to the second-named power means while isolating said first-named power means from said source therefor.

19. In a mobile vehicle of the character described having a working upper unit mounted by a turntable upon a wheeled lower unit, the wheels of said lower unit including steering wheels, a plurality of outrigger support mechanisms carried by said lower unit for movements between lowered operating positions and elevated inoperative positions, power means on said lower unit activated by fluid pressure and connected with said outrigger mechanisms for operating the mechanisms in said movements, power means on said lower unit activated by fluid pressure and connected with said steering wheels for operating the steering wheels in their steering movements, and means for isolating said power means which operates the outrigger mechanism, from a source of fluid pressure therefore, automatically when fluid pressure is being delivered to the power means which operates the steering wheels.

References Cited in the file of this patent
UNITED STATES PATENTS 2,400,803    Barnhart _____ May 21, 1946
2,855,111    McIntyre _____ Oct. 7, 1958